United States Patent [19]

Turner et al.

[11] 3,958,225
[45] May 18, 1976

[54] APPARATUS AND METHOD FOR CONTROLLING A COMMUNICATIONS TERMINAL

[75] Inventors: Kenneth W. Turner, Des Plaines; George C. Zobel, Palatine, both of Ill.

[73] Assignee: Teletype Corporation, Skokie, Ill.

[22] Filed: Jan. 28, 1974

[21] Appl. No.: 437,257

[52] U.S. Cl............................ 340/172.5; 325/38 A; 340/324 A
[51] Int. Cl.²........................................... G06F 3/14
[58] Field of Search...... 340/172.5, 324 A, 324 AD; 325/38 A

[56] References Cited
UNITED STATES PATENTS

| | | | |
|---|---|---|---|
| 3,248,705 | 4/1966 | Dammann et al. | 340/172.5 |
| 3,346,853 | 10/1967 | Koster et al. | 340/172.5 |
| 3,531,796 | 9/1970 | Kiesling | 340/324 |
| 3,579,201 | 5/1971 | Langley | 340/172.5 |
| 3,609,743 | 9/1971 | Lasoff et al. | 340/324 |
| 3,623,009 | 11/1971 | Ragen | 340/172.5 |
| 3,631,403 | 12/1971 | Asbo et al. | 340/172.5 |
| 3,631,457 | 12/1971 | Hamada et al. | 340/324 A |
| 3,641,501 | 2/1972 | Lloyd et al. | 340/172.5 |
| 3,651,484 | 3/1972 | Smeallie | 340/172.5 |
| 3,656,131 | 4/1972 | Libby et al. | 340/172.5 |
| 3,706,075 | 12/1972 | Fredrickson et al. | 340/172.5 |
| 3,753,236 | 8/1973 | Flynn et al. | 340/172.5 |
| 3,753,243 | 8/1973 | Ricketts et al. | 340/172.5 |
| 3,760,171 | 9/1973 | Wang et al. | 340/172.5 |
| 3,771,155 | 11/1973 | Hayashi et al. | 340/324 AD |
| 3,792,462 | 2/1974 | Casey et al. | 340/324 AD |

FOREIGN PATENTS OR APPLICATIONS

| | | |
|---|---|---|
| 1,169,949 | 0000 | United Kingdom |
| 1,315,150 | 0000 | United Kingdom |
| 1,324,616 | 0000 | United Kingdom |

*Primary Examiner*—Gareth D. Shaw
*Assistant Examiner*—Michael C. Sachs
*Attorney, Agent, or Firm*—W. K. Serp; J. L. Landis

[57] ABSTRACT

A communications terminal control circuit is described which includes a preprogrammed memory. The memory provides a plurality of sequential instruction signals each serving to direct at least a selected operational sequence of the terminal. Two command and two status decoders are included, each responsive to at least one of the instructional signals and capable of initiating a unique terminal operation in response to a selected instructional signal from the memory. Means are provided for comparing outgoing and incoming coded information with selected memory locations thereby analyzing such coded information and directing selected operative terminal instructions in response thereto.

21 Claims, 11 Drawing Figures

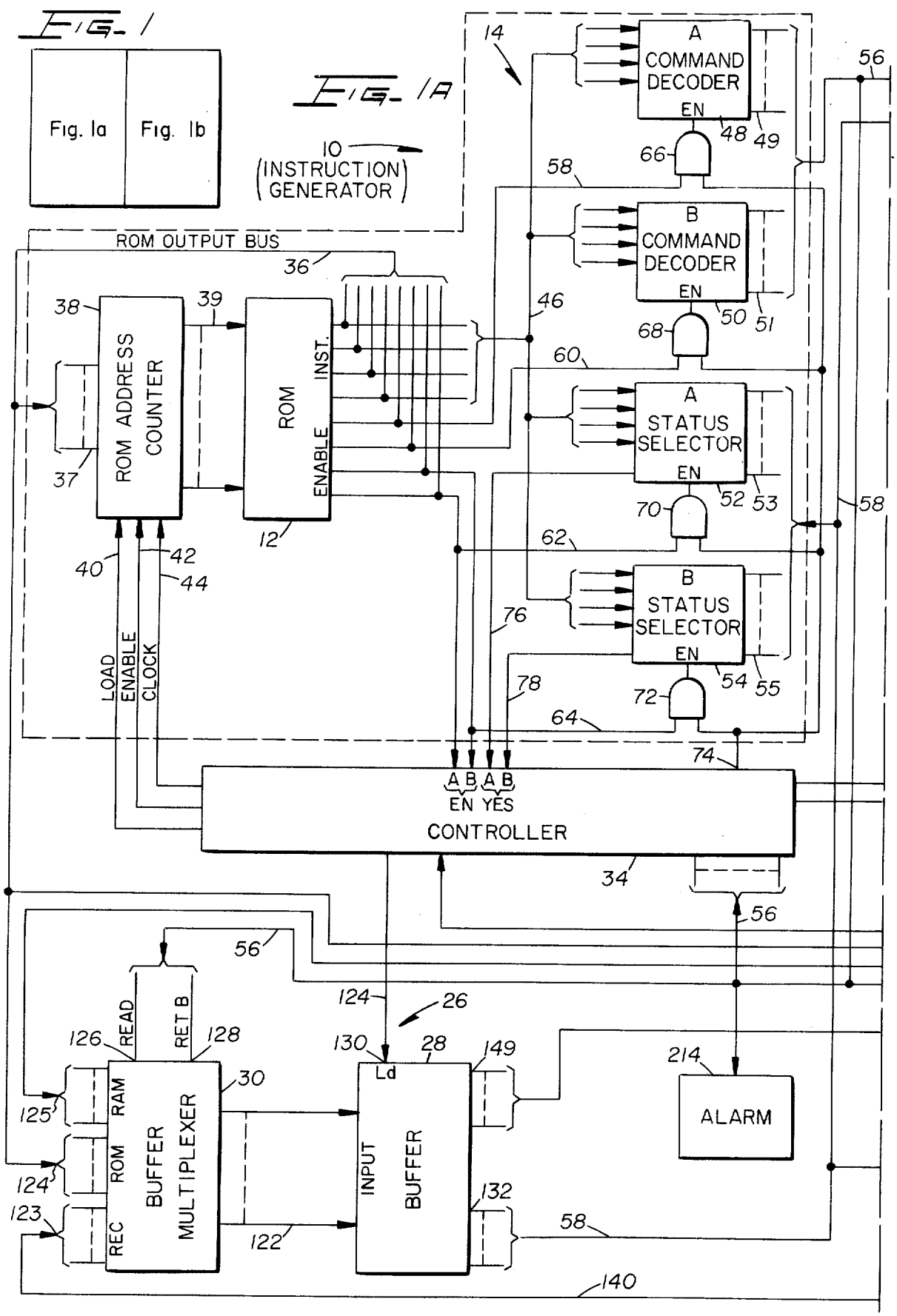

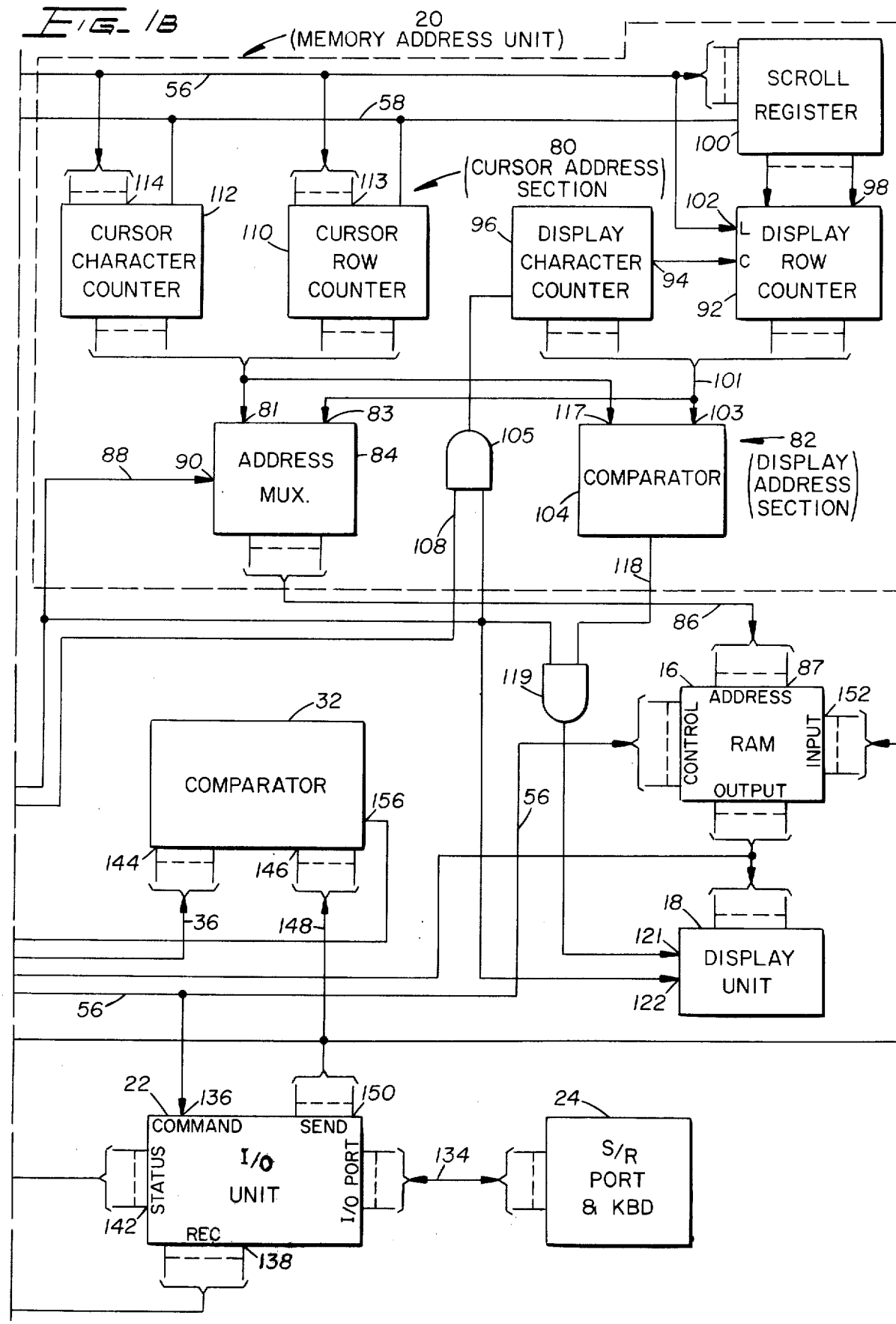

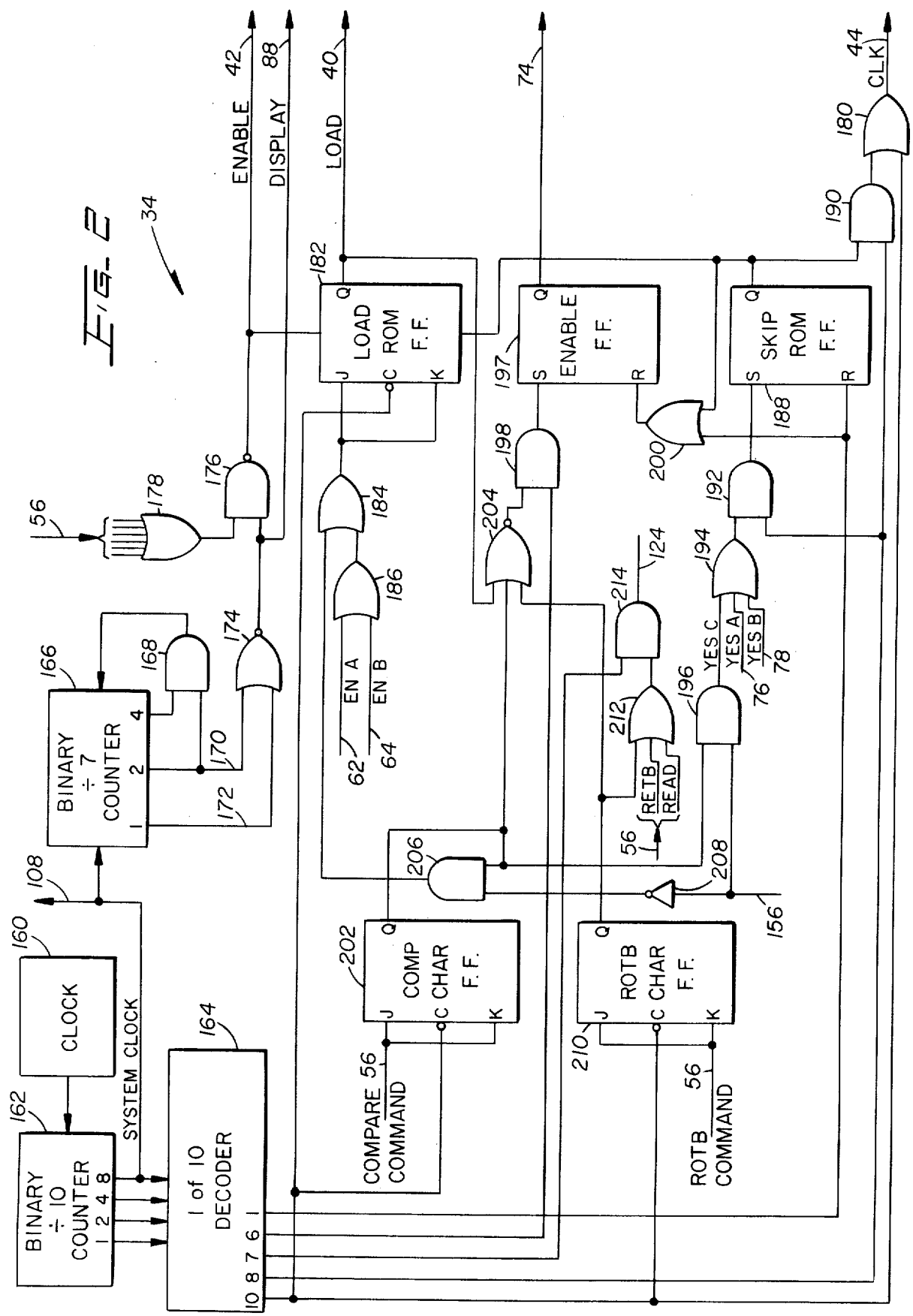

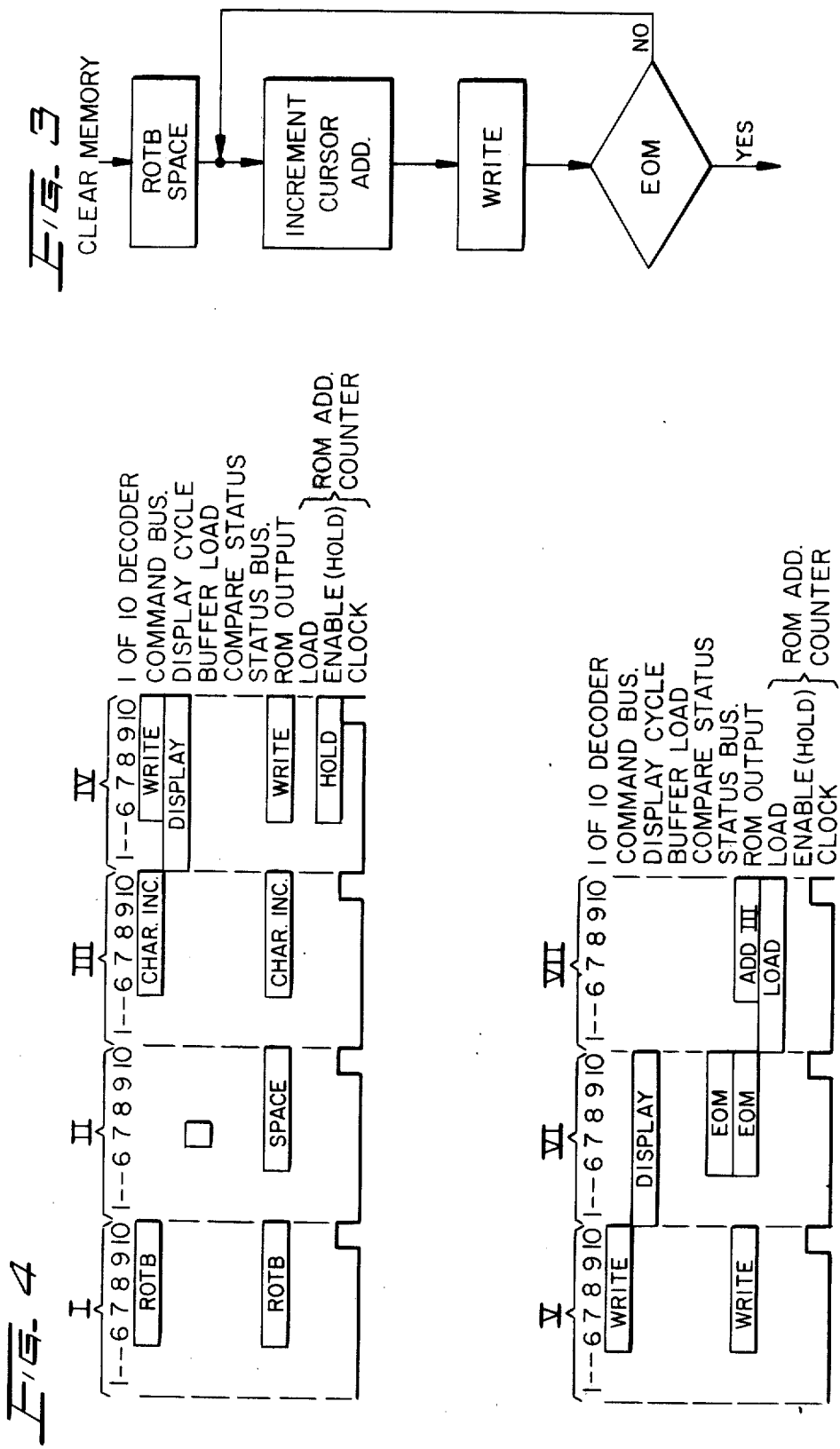

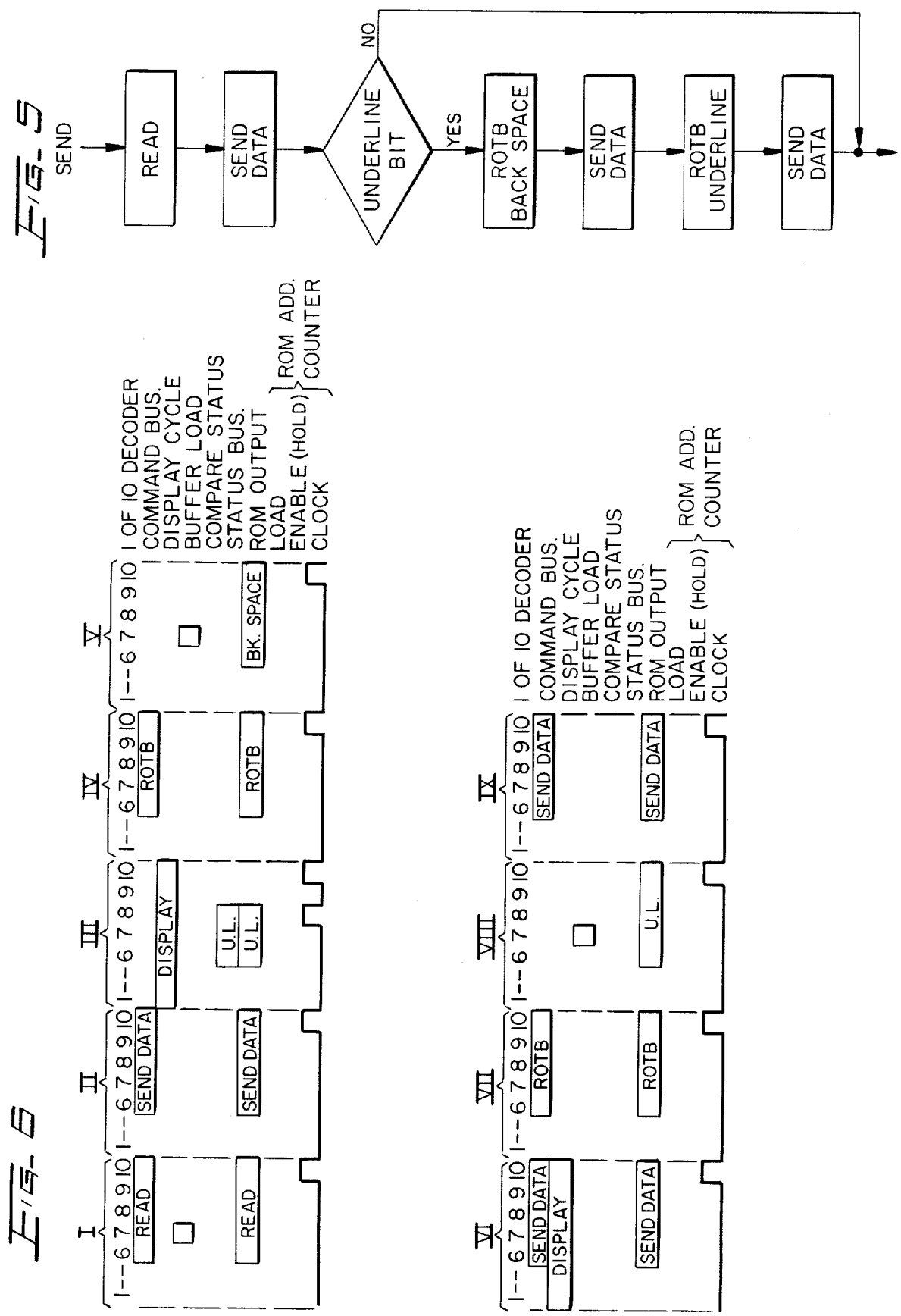

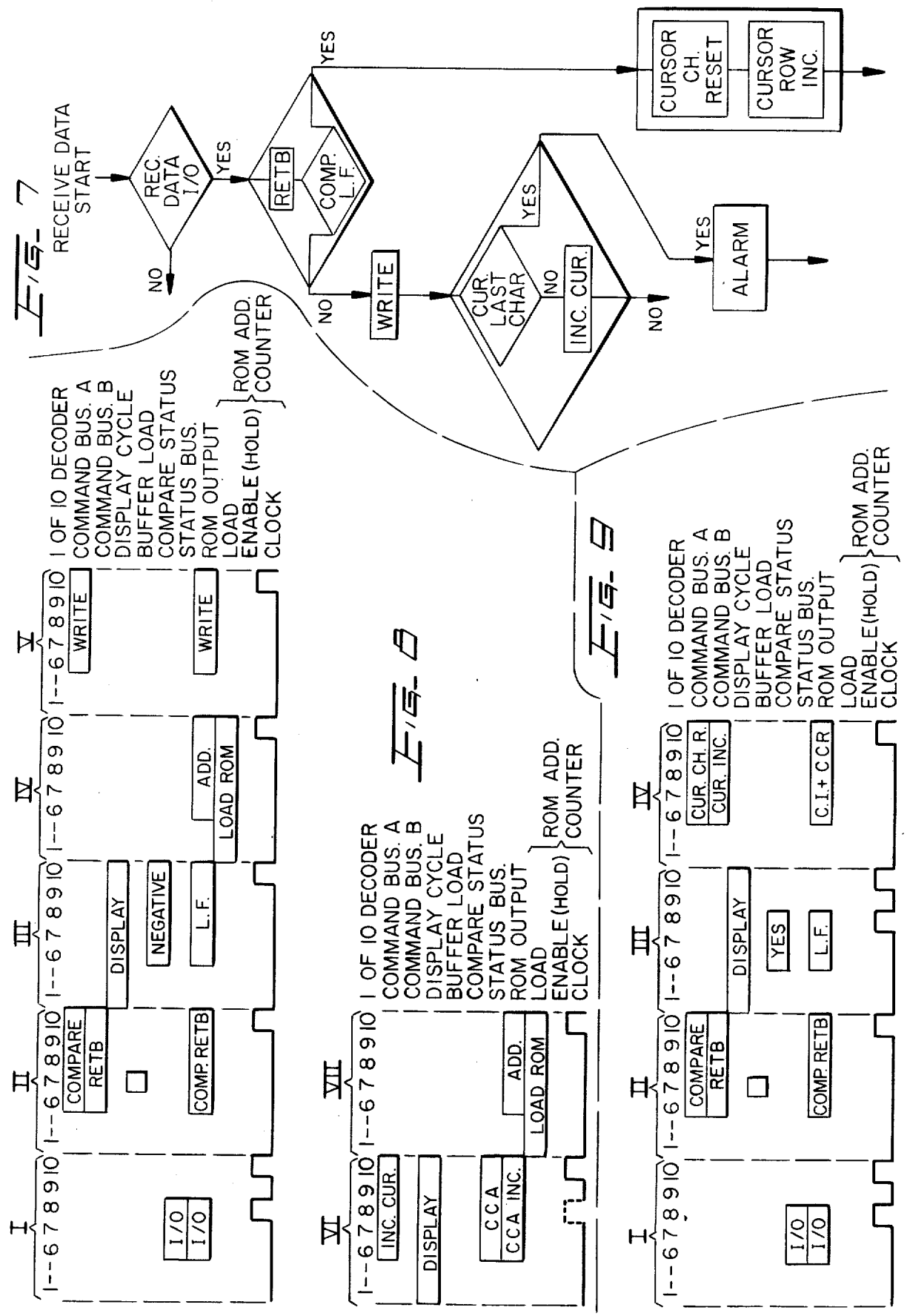

APPARATUS AND METHOD FOR CONTROLLING A COMMUNICATIONS TERMINAL

BACKGROUND OF THE INVENTION

This invention generally relates to a control circuit for a communications terminal which provides a visual presentation of stored information and more particularly relates to such a control circuit wherein selected information is stored in a random access memory and includes means for continuously editing the memory.

Information display communications terminals are widely used as devices for the reception and transmission of encoded data. Such terminals generally receive and store data from an incoming line or keyboard, with the stored information being displayed upon the screen of a cathode ray tube. A particular feature of such terminals is their ability to store, edit and read out the information in response to selected commands. Heretofore, such devices have generally operated sequentially rather than synchronously. That is, in a sequential device the control circuitry executes various status inquiries and commands individually and in sequence. In this regard, the readout from the memory to the display is sequentially interlaced with other operations which are interrupted during display refresh even though their execution does not command use of the memory. It will be appreciated that such sequential operation considerably reduces the effective speed of the terminal as compared to snychronous operation wherein several terminal operations may be performed simultaneously. The control circuit described in the illustrated embodiment being synchronous allows multiple operations to be performed simultaneously and, so long as the selected operations do not simultaneously command use of the memory, they may be performed concurrently with the display refresh.

A feature provided by some terminals is their ability to display characters having selected attributes. For example, the letter A may be underlined or highlighted to provide it with a distinguishing characteristic, setting the letter apart from the remainder of the displayed text. Prior devices have usually stored such attribute information as a separate work in the memory; each stored character having one or more attribute memory work positions associated therewith. As the number of selected attributes increases, some of which are mutually exclusive, the codes and the number of memory positions necessary to store the codes becomes quite large. Consequently, such an arrangement consumes a considerable amount of memory space thus greatly increasing the cost and complexity of the terminal. With respect to the illustrated embodiment, the attributes are stored as bits in extended code levels of the character code. During readout, the attribute information is converted from its parallel state (extended bit level) and sent from the terminal serially. This arrangement results in a reduction of the memory size and thus the cost and complexity of the terminal are reduced.

With respect to prior terminals, the incoming codes are analyzed to determine the presence of selected machine functions and character attributes. Implementation of this analysis procedure has generally included decoders each of which is adapted to respond to the presence of a predetermined incoming code. A particular difficulty with such an arrangement is its inflexibility in accommodating unique user requirements since the decoders are generally hard-wired. The described embodiment overcomes such inflexibility by analyzing the incoming codes by a comparison system wherein incoming codes are compared against selected codes stored in a preprogrammed memory. A coincidence signal is generated by the comparator indicating that the incoming code is a machine function or character attribute of particular user significance. In this manner, each terminal can conveniently be tailored to the unique requirements of the user by modifying the coding of the preprogrammed memory. This feature permits adaptation of the terminal to user requirements without the necessity of changing the circuitry of the terminal unit.

Thus, the illustrated embodiment provides an improved highly flexible communications terminal capable of manipulating data at increased operational speed. Such advantages are attained without increasing the cost or complexity of the system.

SUMMARY OF THE INVENTION

A control circuit for a communications terminal which includes a selectively addressable memory provides a plurality of sequential predetermined instruction signals each of which serves to direct at least one selected operational sequence of the terminal. At least two decoders are included which are responsive to at least one of the instructional signals. Each of the decoders is capable of initiating a unique terminal operation in response to a selected instructional signal from the memory so that two or more unique terminal operations may be executed simultaneously in response to a single instructional signal from the memory.

As more particularly described, at least one of the decoders is a command decoder responsive to the instructional signal and providing an operative command signal in response thereto. At least one of the decoders is a status selector which serves to ascertain a unique operative condition of the terminal in response to the instructional signal providing a status signal relative thereto. As determined by the status signal, the memory is addressed to a new location.

Additionally, the illustrated embodiment includes a random access memory (RAM) selectively addressable by either a first address unit or a second address unit. The first address unit addresses the RAM during editing thereof and the second address unit addresses the RAM during display. Switching means are included for selecting the appropriate address unit on a shared basis during reoccurring time intervals.

It is a main object of this invention to provide a control circuit for a display terminal having improved operational speed and inherent flexibility for convenient adaptation to unique user requirements.

Other objects, advantages, and features will be more readily appreciated after reference to the following description and accompanying drawings.

BRIEF DESCRIPTION OF THE DRAWINGS

FIG. 1 which consists of combined FIGS. 1A and 1B, is a schematic diagram of a control circuit for a communications terminal illustrating certain features of this invention.

FIG. 2 is a detailed diagram of a component of the embodiment illustrated in FIG. 1, FIG. 3 is a logic flow diagram illustrating an operational sequence of the apparatus of FIG. 1.

FIG. 4 is a timing diagram ilustrating the operation of the apparatus of FIG. 1 during execution of the operational sequence of FIG. 3.

FIG. 5 is a logic flow diagram illustrating a second operational sequence of the apparatus of FIG. 1.

FIG. 6 is a timing diagram illustrating the operation of the apparatus of FIG. 1 during execution of the operational sequence of FIG. 5.

FIG. 7 is a logic flow diagram illustrating a third operational sequence of the apparatus of FIG. 1.

FIG. 8 is a timing diagram illustrating the operation of the apparatus of FIG. 1 during execution of the operational sequence of a portion of the logic flow diagram of FIG. 7; and FIG. 9 is a timing diagram illustrating the operation of the apparatus of FIG. 1 during execution of the operational sequence of still another portion of the logic flow diagram of FIG. 7.

DETAILED DESCRIPTION

— General —

With particular reference to FIG. 1, the control circuit includes an instruction generator 10 which generates, in a predetermined sequence, various selected instructional commands and status inquiries. A preprogrammed read only memory (ROM) 12 forming part of the instruction generator 10 instructs a decoding means 14 which initiates preselected command signals and status inquiries assuring that the selected information is displayed, received and sent in appropriate format and sequence. It will be later appreciated that with the arrangement illustrated, a plurality of simultaneous command signals and status inquiries may be initiated in response to a single ROM 12 location. This particular feature affords a more efficient utilization of available memory capacity which is selected to provide a bit capacity sufficient to accommodate the various terminal operations desired. A suitable ROM is manufactured by Intel Corporation and designated 1302. Further, since a plurality of data manipulations can be undertaken simultaneously, a considerable increase in the effective speed of the terminal is obtained as compared to many previously described arrangements.

Additionally, a random access memory RAM 16 is included which serves to store incoming data in encoded form. The data stored in the RAM 16 is continuously edited and updated and, during a preselected portion of the operational cycle, the RAM 16 supplies selected data to a cathode ray display unit 18. The RAM 16 is addressed with respect to selected locations by a memory address unit 20. As will be further described, the address unit 20 generates the address of a visual cursor, which is maintained upon the display screen at that memory location where RAM 16 editing is occurring, thus providing the operator with a marker designating that location at which incoming information is being entered into the memory.

The control circuit additionally includes an input-output "I/O" unit 22 which serves to interface the control circuit with an external signal source such as an operator keyboard or incoming line send receive port 24. All incoming and outgoing information passes through the I/O unit 22 and is routed therefrom in response to command signals from the instruction generator 10. All coded information being sent from the RAM 16 to the I/O unit 22 and read into memory from the I/O unit 22 is passed through a buffering means 26 whereat it is checked for the purpose of determining the presence of character attributes such as underline, tab, etc. As will be further described, such character attributes are stored in the RAM 16 as additional code levels rather than an separate data words. This feature results in a greater utilization of the available memory space and increased effective system operational speed. The buffering means 26 includes a buffer 28 switched to selected input sources by a multiplexer 30 controlled by command signals from the instruction generator 10. The multiplexer is an electronic switch which, in response to a prearranged address serves to direct one of several inputs (REC, ROM or RAM) to multilevel output terminals. A suitable multiplexer is manufactured by Signetics Corporation and designated 8263. Additionally, the control circuitry includes a data comparator 32 which serves to selectively compare the information stored in the buffer 28 with the output of the ROM 12 and in this manner analyzes the characteristics of incoming and outgoing code groups. Serving to direct the operational sequence of each of the aforementioned components is a controller 34.

— Instruction Generator —

As mentioned, the instruction generator 10 includes the preprogrammed read only memory (ROM) 12; supplying an eight level code output. Each level of the ROM 12 is coupled via a ROM output bus 36 to the multilevel inputs 37 of a synchronous ROM address counter 38. The multilevel address outputs of the counter 38 are fed via parallel lines 39 to the address inputs of the ROM 12. In response to a load signal from the controller 34 via a line 40, to the load input of the ROM address counter 38, the synchronous address counter 38 loads on the next clock pulse with the ROM 12 output thereby addressing the ROM 12 to the next address. Additionally, the controller 34 supplies enable and clock signals via lines 42 and 44 to respective enable and clock inputs of the counter 38. The clock signal increments the ROM address counter 38 in the absence of a hold signal. Correspondingly, the presence of a hold signal at the enable input of the ROM counter 38 prevents incrementation of the counter 38 in response to clock signals at the clock input thereof.

Four of the eight ROM outputs are designated instruction outputs and are parallel fed via bus 46 to the address inputs of command decoders A and B, respectively 48 and 50, and to address inputs of status select decoders A and B, respectively 52 and 54, which are in the logic form of demultiplexers. Suitable command decoders and status selectors are manufactured by Texas Instruments Inc. and designated SN 74154 and 74150, respectively. Other equivalent components will be obvious to those skilled in the art. The command decoders A 48 and B 50 decode the ROM instruction outputs into command instructions which appear at the parallel output levels 49 and 51 thereof and fed throughout the control circuit via a command bus 56. Thus, in response to a single ROM 12 address, two distinct command instructions may be generated. It will be appreciated that the number of command decoders may be varied in accordance with the requirements of the system. The command decoding instructions from the ROM 12 are generally arranged so that each of the instructions selected by the individual command decoders 48 and 50 may be performed simultaneously effectively increasing the speed of the system and decreasing the required ROM 12 capacity as compared with a sequential processing arrangement. Additionally, the four instruction outputs of the ROM are parallel fed via the bus 46 to address inputs of the status decoders 52 and 54, which are in the form of 16 line to 1 line multiplexers. Multilevel inputs 53 and 55 of the status selectors 52 and 54 are similarly fed from a status bus 58 by the various components of the apparatus as will be subsequently described. It will be appreciated that the illustrated embodiment allows the creation of two status inquiries as well as two command instructions in response to a single ROM 12 address location.

The remaining four ROM 12 outputs are designated enable outputs 58, 60, 62, and 64. Two of the enable outputs 58 and 60 are connected respectively to one input of each of dual input A and B command decoder AND-gates 66 and 68 and the remaining enable outputs 62 and 64 connected to one input of A and B status selector dual input AND-gates 70 and 72. The outputs of each of the AND-gates 66, 68, 70 and 72 are connected to enable inputs of their respective decoders 48, 50 or selectors 52, 54. The remaining inputs to the AND-gates 66, 68, 70 and 72 are commonly connected to an enable output 74 of the controller 34. In response to the simultaneous occurrence of an enable signal from the controller 34 and a selected enable signal from the ROM 12, one or more of the command decoders 48, 50 and status selectors 52, 54 are enabled. Additionally the status enable outputs from the ROM are designated EN A and EN B and are fed respectively via lines 62 and 64 to status enable inputs of the controller 34. Serving to provide status signals to the controller 34 in response to selected status inquiries by the selectors, a decisional signal from each of the status selectors is fed to the controller via lines 76 and 78 to respective inputs of the controller designated YES A and YES B.

— Memory Address Unit —

With particular reference to FIG. 1B, the memory address unit 20 is conceptually divided into two sections. A first cursor address section 80 addresses the RAM 16 with respect to the memory location at which editing is being performed. A second display address section 82 serves to address the RAM 16 during display of the RAM 16 information thereby selecting a particular character for display. The outputs of both the cursor 80 and display 82 address sections are fed to respective multilevel inputs 81 and 83 of an address multiplexer 84, the output of which is fed via a RAM address bus 86 to an address input 87 of the RAM 16. Serving to control the multiplexer 84 is a display control signal from the controller 34 fed via line 88 to the control input 90 of the multiplexer 84.

The display address section 82 includes a display row address counter 92 clocked by the carry output 94 of a display address character counter 96. After the display character counter 96 steps through each character position in a row, the carry pulse is fed to the clock input of the display row counter 92 causing it to increment one address level. Serving to determine the first row of the memory segment to be displayed, preset inputs 98 of the display row counter 92 are connected to the outputs of a scroll address register 100 which contains the address of the first row of the RAM 16 segment to be displayed. This scroll address is provided by command signals fed from the command bus 56 to scroll register 100. For additional information concerning a similar scrolling arrangement, reference is made to U.S. patent application filed Nov. 9, 1973, entitled "Scrolling Circuit For A Visual Display Apparatus" by G. C. Zobel, Ser. No. 414,580, and incorporated herein by reference. Thus, in response to a selected command signal from the instruction generator 10 fed via bus 56, the scroll register loads with the address of the first row of the RAM 16 segment to be displayed and in response to a load command at input 102 the register 100 address is loaded into the row counter 92. Thereafter, the row address counter 92 is incremented once for each cycle of the character counter 96 until the entire memory segment to be displayed has been addressed. The multilevel outputs of the display character counter 96 and display row counter 92 are fed by a display address bus 101 to the multilevel input 83 of the address multiplexer 84 and additionally to one multilevel input 103 of an address comparator 104. Serving to clock the display character counter 96 is the output of a memory address dual input AND-gate 105, one input of which is fed by a display cycle control signal from the controller via the line 88 and the remaining input of which is fed by a system clock signal from the controller via a line 108.

The cursor address section 80 of the memory address unit 20 is similarly composed of a cursor row address counter 110 which supplies the row address of the cursor. The binary output level of the cursor row counter 110 is fed through the status bus 58 to the status selectors 52 and 54 of the instruction generator 10 as is the binary level of a cursor character address counter 112. Both the cursor row counter 110 and the cursor character counters 112 levels are preset in response to control signals from the command bus 56 at respective multilevel ports 113 and 114. The multilevel outputs of each of the cursor counters 110 and 112 are parallel fed to the multilevel input 81 of the address multiplexer 84 and to one multilevel input 117 of the address comparator 104. The comparator 104 in response to a coincidence between the two input signals generates a cursor display signal which is fed through conductor 118 to one input of a cursor display dual input AND-gate 119, the remaining input being fed by a display cycle signal from the controller 34 via the line 108. In response to a coincidence of these two signals, the AND-gate 119 sends a cursor signal to port 121 of the display unit 18 causing the display to generate a cursor indicator on the screen. Additionally, the display control signal from the controller 34 is fed via line 88 to an enable input 122 of the display unit 18. A display unit for generating a suitable cursor is described in U.S. patent application Ser. No. 388,286, filed Aug. 14, 1973, by T. J. Mau, Jr. and J. L. Peterson and incorporated herein by reference.

— Buffering Means —

The buffer 28 serves a three fold purpose as determined by the multiplexer 30. That is, the buffer selectively receives the output of the I/O unit 22, the output of the ROM 12, or selectively loads with the output of the RAM 16 before the coded characters are sent to the I/O unit 22, the RAM 16 or the comparator 32. Correspondingly, the multiplexer 30 has three inputs 123, 124, and 125 each one of which is switched to the buffer 28 in response to an incoming command signal on the command bus 56. The multiplexer 30 input 124 designated ROM receives the output of the ROM 12 whereas the remaining inputs 123 and 125 designated REC (receive) and RAM, (random access memory) are respectively fed by the multilevel outputs of the I/O unit 22 and the RAM 16.

Serving to switch the RAM output to the buffer is an READ signal fed to a control port 126 of the multiplexer from the command bus 56. Similarly an RETB signal from the command bus 56 to multiplexer port 128 switches the multiplexer Receive input to the buffer 28. In the absence of neither a READ nor a RETB signal, the multiplexer 30 switches the ROM 12 output to the buffer which condition is considered for discussional purposes an ROTB (ROM to buffer) signal. The multilevel outputs of the multiplexer 30 are connected via parallel lines 122 to the input of the buffer 28. Serving to selectively load the buffer 28 is a load signal via line 124 from the controller to a buffer load input 130. Additionally, the buffer includes a multilevel status port 132 connected to the status selectors 52, 54 via the status bus 58.

Serving to connect the I/O unit 22 to the S/R port 24 are multilevel input/output leads forming an I/O bus 134. In response to a command signal from the instruction generator 10 via the command bus 56 to a command input 136 of the I/O unit 22, the I/O port is switched between send and receive functions. As mentioned, a multilevel receive port 138 is connected to the receive input 123 of the multiplexer 30 via a receive bus 140. As will subsequently be further clarified, all receive signals are passed through the buffer for analysis prior to being written in the memory. Serving to provide an informational signal related to the presence of incoming data at the I/O unit 22, the I/O unit includes a status port 142 connected to the status bus 58.

When a character from the RAM 16 is sent from the buffer 28 through the I/O unit 22, it is present at the buffer 28 and checked to determine the presence of selected character attributes. For example, an underlined character is sent through the I/O unit 22 as three characters. The first encoded character is the selected alphanumeric symbol, the second a backspace character, and finally, an underline character is sent. However, the entire underlined character is stored in the RAM 16 in a single memory level indicating the presence of an underline attribute. It will be appreciated that this feature permits greater utilization of available memory space. The cooperation of the various components illustrated in FIG. 1 will be more thoroughly considered in relation to specific operational examples subsequently described in connection with FIGS. 3 through 9, inclusive. The ROM 12 output is fed to one input 144 of the comparator 32, the remaining input 146 being connected via send bus 148 to the buffer output 149 to the send input 150 of the I/O unit 22 and to the write input 152 of the RAM 16. A comparison signal from the comparator 32 is fed via line 156 to the controller 34.

— Controller —

The controller 34, particularly illustrated in FIG. 2, serves to coordinate the operation of the various components of the control circuit. As previously mentioned, the controller 34 provides the load, enable and clock signal via the lines 40, 42 and 44 to the ROM address counter 38. Additionally, the controller 34 supplies a system clock signal via line 108, as well as the display control signal via line 88 and includes a clock 160 driving a binary decade counter 162, which in turn addresses a one of ten decoder 164. The decoder 164 serves to sequence the operation of the controller 34. A suitable decoder is manufactured by Texas Instruments Inc. designated SN 7442. The eighth count output of the counter 162 supplies the system clock signal via the line 108 and additionally drives a divide by seven binary counter 166 a suitable type being manufactured by Texam Instruments Inc. and designated SN 74163. Thus, in response to each decoder 164 cycle, a clock pulse is fed to the divide by 7 counter 166. The one, two, and four outputs of the counter 166 are utilized with the two and four levels fed to respective inputs of a dual input AND-gate 168, the output of which is used to reset the counter to obtain the divide by seven feature. The first and second levels of the counter are fed to respective inputs via lines 170 and 172 of a dual input NOR-gate 174, the output of which is fed to one input of a dual input display enable NAND-gate 176. It will be appreciated that both the first and second binary outputs of the counter 166 go low at counts one and five. Therefore, the output of the NOR-gate 174 goes high during two out of the seven counts. This two out of seven display cycle control signal is fed via line 88 to the address multiplexer AND-gates 105 and 119 (FIG. 1B). As previously mentioned, the multiplexer 84, in response to the display signal, switches the display address section 82 output to the address input 87 of the RAM 16. The output of the NOR-gate 174 is also fed to one input of the enable NAND-gate 176, the remaining input of which is fed from the output of a command bus multi input OR-gate 178. The command bus 56 is fed to the inputs of the OR-gate 178 so that upon coincidence of a display signal, and an instructional command for the RAM 16, the NAND-gate 176 goes low holding the ROM counter 38 thus preventing the counter from stepping in response to a clock signal during that portion of the cycle when the memory is refreshing the display.

With reference to the one of ten decoder 164, the first, sixth, seventh, eighth, and tenth outputs thereof are utilized. A clock signal is fed to the ROM counter 38 via line 44 from the tenth output of the decoder 164 through one input of a dual input ROM counter clock OR-gate 180. The tenth output of the decoder is also fed to the clock input of a negative edge triggered load ROM flip-flop 182 and the J and K steering inputs thereof are connected to the output of a dual input OR-gate 184. One input of the OR-gate 184 is fed by the output of a dual input status enable OR-gate 186, each of the inputs of which are fed by the status enable A and B output lines 62 and 64 from the instruction generator 10. The J-K input levels of the flip-flop 182 are transferred to the output thereof on the subsequent tenth count decoder 164 output sending a load signal via line 40 to the ROM counter 38. Thus, the ROM counter 38 is loaded in response to a selected status determination as will be subsequently described. Serving to selectively reset the load flip-flop 182 is the output of a skip ROM RS flip-flop 188. When the skip ROM flip-flop 188 is set, the load word flip-flop 182 is reset and since the reset input overrides the clock input, the load flip-flop 182 is prevented from sending a load signal to the counter 38.

As will be further considered, in response to a status check, the ROM counter 38 is either double clocked (skipped) or loaded as determined by the results of the status check. In this regard, the output of the skip flip-flop 188 is also connected to one input of a dual input skip AND-gate 190 the output of which is fed to the remaining input of the clock OR-gate 180. The alternate input of the AND-gate 190 is fed from the eight count output of the one of ten decoder 164. The set input of the skip flip-flop 188 is fed from the output of an AND-gate 192, one input of which is connected to the count eight output of the decoder 164 and the remaining input of which is connected to the output of a triple input YES OR-gate 194. Two of the inputs of the OR-gate 194 are fed from the decisional outputs of the status selector designated YES A and YES B via lines 76 and 78 and the third input of the OR-gate is connected to one output of a comparison AND-gate 196, designated for purpose of illustration YES C. As will be subsequently described, the YES C decisional signal is generated in response to a comparison check by the data comparator 32. When the skip ROM flip-flop 188 is set, a high signal condition exists at one input of the AND-gate 190 allowing a count eight clock signal to be fed from the decoder through the clock OR-gate 180 as well as the normal count 10 signal from the decoder 164. In this manner, the ROM counter 38 double increments for each cycle of the decoder 164 as compared to the normal single increment for each decoder cycle when the skip flip-flop 188 is reset. Serving to reset the skip flip-flop 188, the first count of the decoder 164 is fed to the reset input thereof.

In summary, the status enable A and B signals via lines 62 and 64 pre-condition the load ROM flip-flop 182. In the absence of an affirmative status check, which corresponds to a NO condition, the load ROM flip-flop 182 is clocked on the tenth decode count, thereby transferring the J-K inputs to the output, and, in response, the ROM address counter 38 loads with the output of the ROM 12 on the following clock pulse from the OR-gate 180. Alternatively, if the status check determination is affirmative, a YES A or YES B signal is fed to one of the inputs of the status OR-gate 194 and the skip ROM flip-flop 188 to set on the eighth clock pulse of the decoder. Upon setting, the skip ROM flip-flop 188 inhibits the load ROM flip-flop 182, and the eighth and tenth counts of the decoder pass through the OR-gate 180 to the ROM counter 38 skipping the counter. In this manner, the counter 38 loads with the output of the ROM 12 in response to a negative status determination and in response to an affirmative determination, the ROM counter 38 double increments. As previously mentioned, a particular feature of the illustrated embodiment is the ability of the disclosed apparatus to execute two simultaneous status inquiries. It will be appreciated that a negative response to both inquiries results in a ROM load signal and a dual affirmative response to a double increment of the ROM address counter 38. A mixed response that is both an affirmative and a negative simultaneous status determination causes the ROM counter 38 to skip since the skip flip-flop 188 output to the reset input of the load ROM flip-flop 182 prevents toggling of the flip-flop 182. The ROM 12 program is written to perform simultaneous status checks that are interrelated so that mixed status checks will be processed as an affirmative determination. The logic flow of the ROM program will be further considered in connection with FIGS. 3–9, inclusive.

As previously mentioned, one input of each of the enable AND-gates 66, 68, 70 and 72 (FIG. 1A) are fed by an enable signal from the controller 34. This signal is generated by the output of an enable RS enable flip-flop 197; the output of which is fed to the instruction generator via the line 74. The set input of the flip-flop 197 is fed by the output of an enable AND-gate 198 one input of which is connected to the count six output of the decoder 164. The reset input of the flip-flop 197 is fed by the output of a dual input OR-gate 200. The inputs of the gate 200 are respectively coupled to the output of the skip ROM flip-flop 188 and the count one output of the decoder 164. Thus, in response to the six count output of the decoder 164, the enable flip-flop 197 is set and is reset in response to either the output of the skip flip-flop 188 which occurs at count eight of the decoder 164 in response to an affirmative status check or the first count of the decoder 164. In this manner, the command 48 and 50 and status 52 and 54 decoders are enabled during the sixth through the tenth counts of the decoder 164 for a command only condition or a ROM counter 38 load condition and during the sixth through eighth counts of the decoder 164 for a ROM counter 38 skip condition. During the first six counts of the decoder 164, the command decoders 48 and 50 and status selectors 52 and 54 are inhibited. This delay feature allows the ROM 12 to settle in response to a new address before instructing the decoders thereby preventing erroneous status inquiries and command instructions. Additionally, it will be appreciated that, in response to an affirmative status inquiry, the ROM counter 38 is double clocked from counts eight through ten of the decoder. During this period of the command 48 and 50 and select 52 and 54 decoders are similarly disabled thus preventing status inquiries and commands from being generated.

The data comparator 32 (FIG. 1B) serves to compare the data from the buffer 28 with the output of the ROM 12. This condition occurs when the multiplexer 30 is either in the REC (receive) ROM or RAM positions. Thus all information sent through the I/O unit 22 or received therefrom is checked to determine the presence of certain character attributes such as underline, highlight, etc. The comparator 32 serves to continually compare the buffer 28 output with the ROM 12 output; however, a meaningful reading of the comparator 32 is accepted by the controller 34 during selected operational periods in response to a compare signal on the command bus 56. This command signal is fed to the J-K inputs of a compare character flip-flip 202 (FIG. 2); the clock input of the flip-flop 202 being triggered by the tenth count output of the decoder 164. In response to a compare command via bus 56, the J-K inputs go high and this level is transferred to the output of the flip-flop 202 upon the subsequent tenth count decoder 164 output. The flip-flop 202 output is fed to one input of a triple input enable NOR-gate 204, causing one input of the enable AND-gate to go low. In this way, the setting of the enable flip-flop 197 is prevented which thus inhibits the command decoders 48 and 50 and status selectors 52 and 54 during a comparison check. Additionally, the positive going output of the flip-flop 202 is fed to one input of a dual input compare AND-gate 206 and to one input of the compare YES AND-gate 196, thus following the outputs of both AND-gates 206 and 196 to follow the signal levels at their remaining inputs. The remaining input to the YES AND-gate 196 is fed by the coincidence output of the comparator 32 via line 156 and a high comparison signal, which corresponds to an affirmative determination, is thus coupled through the OR-gate 194 and AND-gate 192, causing the skip ROM flip-flop 188 to set. In response, the ROM address counter 38 double checks in a manner similar to that described in connection with the system response to an affirmative status selector determination.

In the event the comparator 32 output is low indicating a negative determination, this low signal is inverted by an inverter 208 and fed to the remaining input of the compare AND-gate 206. A high level at the input of the AND-gate 206 brings the input of the enable OR-gate 184 high, and the J-K preset inputs of the Load ROM flip-flop 182 high. This preset level is transferred on the falling edge of the tenth count of the decoder 164, and the flip-flop 182 output goes high. In response, the ROM counter 38 loads with the output of the ROM 12 on the following clock pulse from gate 180. As previously mentioned, in response to an affirmative status determination, the ROM address counter 38 double clocks whereas in response to a NO determination, the ROM address counter 38 loads. Similarly, a YES determination from the comparator 32 results in the counter 38 double clocking and a NO determination results in a counter 38 load. Dual status and comparator inquiries producing mixed determinations result in a skip of the ROM counter 38 since the skip word flip-flop 188 inhibits the load ROM flip-flop 182.

As previously mentioned, the buffer multiplexer 30 switches the output of the RAM 16 to the buffer 28 in response to a READ signal from the instruction generator 34 fed to port 126. Similarly, in response to an RETB command at port 128 the buffer input is switched to the receive port 138 of the I/O unit 22. In the absence of neither an READ or RETB command, the ROM 12 output is switched to the buffer 28 (ROTB). The command decoders 48 and 50 generate an ROTB signal which is fed from the command bus 56 to the J and K steering inputs of a ROM to buffer character flip-flop 210. The clock input of the flip-flop is fed by the tenth count output of the decoder 164 and, in the presence of an ROTB signal, the output of the flip-flop 210 goes high when triggered by the following tenth count decoder 164 output. The output of the flip-flop 210 is fed to one input of a triple input buffer load OR-gate 212 and to one input of the enable NOR-gate 204. The alternate inputs of the buffer OR-gate 212 are connected to the RETB and READ command leads of the command bus 56. Thus, the output of the OR-gate directly follows the RETB and READ signals and follows the ROTB signal during the following decoder 164 cycle. The output of the OR-gate 212 is fed to one input of a dual input buffer load AND-gate 214, the alternate input of which is clocked by the count seven output of the decoder 164. Serving to control the loading of the buffer 28 with the output of the multiplexer 30, the output of the AND-gate 214 is connected via the line 124 to the load input 130 of the buffer 28. Thus, in response to an RETB or an READ signal, the buffer loads with the output of the multiplexer 30 in response to the next decoder 164 count seven pulse which occurs in the same decoder cycle as the READ and RETB commands. However, in response to an ROTB signal, the buffer 28 loads after the flip-flop 210 steering inputs have been transferred to the flip-flop output which occurs on the following cycle.

It will be noticed that the RETB and READ signals are handled differently than the ROTB signal. The ROM 12 instructs the command decoders 48 and 50 to generate all three; however, in response to the RETB and READ signals the buffer loads during the decoder 164 cycle which corresponds to their occurrence since the information to be fed to the buffer is immediately available. On the other hand, in response to an ROTB command, the information to be loaded in the buffer 28 is not present at the output of the ROM 12, but rather is provided by the ROM 12 during the following decoder 164 cycle. For this reason the ROTB character flip-flop 210 instructs the buffer to load during the cycle immediately following the ROTB command.

— Operation —

The operation and interaction of the various components previously described will be more greatly appreciated after reference to the following description of FIGS. 3 through 9. FIG. 3 is a logic flow diagram illustrating the operation of the apparatus with respect to clearing the RAM 16 from the cursor location to the end thereof. If the operator desires to clear the entire RAM 16, the cursor is positioned in the first position of the memory before initiating the clear memory command. In response to an operator command or other incoming signal, the ROM 12 instructs the buffer 28 via the command bus 56 to load with a space code from the ROM 12. Thereafter, a command is given to write the space code into the RAM 16 and the RAM address is incremented one position. A status check is initiated to determine whether the new cursor address is the end of memory position (EOM) which condition occurs when a space has been written into the last memory position. In the event the new cursor address is not the last memory position, the sequence is recirculated and again a space code is written from the buffer 28 into the RAM 16 at the new cursor location. The sequencing is continued until all the RAM 16 positions following the initial cursor position have been written with a space.

FIG. 4 is a timing diagram illustrating the operation of certain components of the illustrated embodiment during the execution of the logic sequence of FIG. 3. In response to the clear memory command, the ROM 12 instructs command decoder A to send an ROTB instruction via command bus 56. In response to the ROTB command, the ROTB signal is fed to the J-K inputs of the ROTB character flip-flop 210 and in response to the tenth count of the decoder 164, the flip-flop 210 output follows the J-K steering inputs sending a high signal to the input of the enable AND-gate 198.

As illustrated, in FIG. 4, during interval I the ROTB command appears during decoder counts 6 through 10, the ROTB command being inhibited during the first four counts to allow the ROM 12 to settle. During decoder interval II ROM 12 generates a space code. In response to count seven, the output of the buffer load NAND-gate 214 goes high, and thus the buffer 28 loads with the ROM 12 output which, in this instance, is a space code. The buffer 28 is not loaded with a space code which will remain in the buffer 28 until new data is subsequently loaded therein. In response to the tenth count of the decoder 164 at the end of interval II, the counter 38 increments and the ROM 12 instructs decoder A 48 to command the cursor address section 80 to character increment. During decoder interval IV, the command decoder A 48, in response to a ROM 12 instruction, sends a write signal to the RAM 16 via bus 56; however, this cycle is a display cycle since the output of the display NOR-gate 174 goes high as determined by the binary divide by seven counter 166. The output of the display AND-gate 176 holds to the ROM address counter 38 and thus the write command is retained during interval IV. The display signal sent via line 106 switches the address multiplexer 84 to the display section 82 of the memory address unit 20 and the RAM 16 refreshes the display during interval IV.

It will be noted that both commands during decoder interval IV required use of the RAM 16 and thus a contention condition existed with the display command having priority. The write command is retained for execution during interval V by holding the ROM counter 38. During interval V, the space code retained in the buffer is written into the RAM 16 at the location determined by the cursor address section 80. In response to the tenth count at the end of interval V the ROM counter 38 increments and in response to the new ROM 12 address, the status selector A 52, in response to a ROM 12 instruction, interrogates the condition of the cursor address section 80 to ascertain the presence of the address of the last memory position. At the start of interval VI, a display signal via line 88 is generated and the address muliplexer 84 swtiches the display address section 82 to the address inputs of the RAM 16. Additionally, the display signal is fed to the display unit 18 causing it to load with the output of the RAM 16. As previously mentioned, both terminal operations during interval IV were in contention for use of the memory with the display command having priority; however the terminal operations during interval VI are not in memory contention. Therefore, the memory display and end of memory status check are performed simultaneously. As illustrated in FIG. 4, it is assumed, for purposes of discussion, that the status check during interval VI produces a negative determination. Thus, the load ROM flip-flop 182 sets on the tenth count of the decoder at the end of interval VI. During interval VII, the ROM counter 38 loads with the output of the ROM 12 which is the address of interval III. In response to this ROM output, decoder A 48 sends a character increment command via bus 56 to the RAM 16. The RAM 16 writes a space code from the buffer 28 placed therein during interval II and the process is repeated until the end of memory status check produces an affirmative determination.

With reference to FIG. 5, a flow diagram is illustrated with respect to the transmission of data from the RAM 16 to the S/R port 24. In response to a Send command, an encoded character is read from the RAM 16 and placed in the buffer 28. Thereafter, the character is sent through the I/O unit 22 to the S/R port 24. The buffer 28 is analyzed to determine whether the coded character is underlined by checking the level containing the underline information. As mentioned, the apparatus stores various character enhancement information in levels rather than as an additional character location in the RAM 16. In response to an affirmative determination, the buffer 28 is loaded with a backspace signal which is then sent through the I/O unit 22 to the S/R port 24 for transmission. Thereafter, the buffer 28 is loaded by the ROM 22 with an underline character which is similarly sent through the S/R port 24. To paraphrase, the character read from ROM 16 is sent through the S/R port 24, and thereafter checked to determine the presence of a bit in the underline level position. In response to an affirmative determination, a backspace, and an underline character are sequentially sent through the I/O unit 22 to the S/R port 24.

With particular reference to FIG. 6, the timing diagram illustrates the operation of the control circuit during execution of the logic of FIG. 5. In response to an incoming send command, the RAM 16 output determined by the cursor address section 80 is read into the buffer during interval I. A READ command from the command decoder B 50, in response to a read instruction from the ROM 12, is sent via bus 56 to one input of the buffer OR-gate 212 and to the control port 126 of the multiplexer 30. In response to count seven of the decoder 164, the output of the buffer NAND-gate 214 goes high and the buffer 28 loads with the output of the multiplexer 30. In response to decoder 164 count ten which is coupled through OR-gate 180, at the end of interval I, the ROM counter 38 is incremented and the ROM 12 instructs command decoder B 50 to send a send data command which is present during counts six through ten of interval II. DUring the interval III, which is a display cycle, the output of the display OR-gate 174 goes high and the address multiplexer 84 switches the display address section 82 to the RAM 16 and the display unit 18 loads with the output of the RAM 16. Additionally, during this interval, the ROM 12 instructs the status decoder A 52 to check the status of the buffer 28, for the presence of a bit in the underline level of the stored code. It will be appreciated that since the underline status check does not utilize the output of the RAM 16, it is performed simultaneously with the display operation. In response to an affirmative determination, the YES A signal via line 76 will go high. This signal is fed to the input of the status OR-gate 194, the output of which, in response to count 8 from the decoder 164 goes high, feeding a signal to the skip ROM flip-flop 188 enabling the skip AND-gate 190; thus sending two clock pulses to the ROM counter 38 at counts 8 and 10 through the clock OR-gate 180.

During interval IV, the ROM 12 instructs the command decoder B 50 to send an ROTB command along the command bus 56. In response to the seventh count of the decoder 164, during interval V, the buffer 28 loads with the output of the ROM 12, which is a backspace character code. As previously mentioned, the buffer loads one interval after the ROTB command. In response to clock pulse six of interval VI, the command decoder A 48 sends a send data command to the I/O unit 22 and the underline code in the buffer 28 is sent through the S/R port. Additionally, during interval VI, the display cycle NOR-gate 174 sends the display signal via line 106 to the memory address unit 20 and the display unit 18. Since the send data and the display operations are not in contention for the RAM 16, both operations are performed simultaneously. At the end of interval VI, the tenth decoder count steps the ROM counter 38 and the ROM 12 in response to the new address again instructs the decoder B 50 to send and ROTB command, setting the ROTB flip-flop 210 during interval VII. During interval VIII the output of the ROM 12, which in this instance is an underline code, is loaded into the buffer 28 and during interval IX, the ROM 12, in response to the next address, instructs command decoder B 50 to send a send data command signal to the I/O unit 22 and the underline character stored in buffer 28 is sent through the S/R port 24.

In summary, responding to the initiation of a send command, each character in the RAM 16 is sequentially stored in the buffer 28 and then sent through the S/R port 24. The coded character stored in the buffer 28 is checked to determine the presence of an underline attribute. If the check is affirmative, a backspace is sent to the buffer 28 from the ROM 12 and therefrom through the S/R port 24. Subsequently, an underline code is loaded into the buffer 28 and sent therefrom to the S/R port 24. As a result, the memory 16 is not required to store the underline feature as a word position but rather the information is carried in the RAM 16 as a bit level which is then read out from the terminal as a group of sequential characters.

With respect to FIG. 7, a flow diagram is set forth illustrating the operational sequences of the illustrated apparatus in response to the receipt of incoming data through the S/R port 24. Throughout the cycling of the ROM 12 program, the I/O unit 22 is periodically checked to ascertain the presence of incoming data. Incoming data is entered into the buffer 28 and checked to determine the presence of a line feed code. As a result of this status check two mutually exclusive logic paths may be selected. In response to a negative determination, the coded character is taken from the buffer 28 and written into the RAM 16 at the cursor location. Subsequently, the cursor row counter 110 is checked to determine the presence of the address of the last character in the row. In response to an affirmative determination, an alarm is sent to the operator indicating that the line is filled, and in response to a negative determination, a cursor increment command is sent to the cursor character address counter 113 incrementing the counter and thus moving the cursor to the next character position. In response to an affirmative line feed determination, the ROM 12 instructs both the A 48 and B 50 command decoders thus creating a dual command situation. The cursor character address counter 114 is reset to the first character of the row and simultaneously, the cursor row address counter 113 is incremented to the address of the next row.

FIG. 8 is a timing diagram illustrating the operation of the control circuit during execution of the logic diagram of FIG. 7. Commencing with decoder count six of interval I, the status selector A 52, as directed by a ROM 12 instruction, checks the status of the I/O unit 22 for incoming data. In response to an affirmative check, the skip ROM flip-flop 188 sets and two clock pulses corresponding to decoder 164 counts eight and ten pass through the clock OR-gate 180 double incrementing (skipping) the ROM counter 38. The output of the ROM 12 during interval II produces a dual command situation. The ROM instructs the command decoder A 48 to send a compare command to the controller 34. As illustrated in FIG. 2, the compare command is fed to the J and K inputs of the compare character flip-flop 202 which, in response to decoder 164 count ten, transfers the compare command signal to the output of the flip-flop 202. The output of flip-flop 202 is inverted by the NOR-gate 204, thus inhibiting the enable flip-flop NAND-gate 198. Simultaneously, command decoder B 50 sends an RETB command to the controller 34 and to the buffer multiplexer 30. The controller 34, in response to the RETB signal, generates a buffer load signal at the output of the buffer AND-gate 214 during clock pulse seven and the buffer 28 loads with the data via line 140 from the I/O unit 22 through the multiplexer 30. This data, which is the incoming coded character, is now present at the buffer input 146 of the data comparator 32.

At the start of interval III, which is a display cycle, the output of the display cycle NOR-gate 174 is high, and the display is refreshed from the RAM 16. In response to a negative line feed comparison the comparator 32 generates a low comparison signal level which is fed via line 156 to the controller 34. The comparison signal is inverted by the inverter 208 and fed to the J-K inputs of the load ROM flip-flop 182. The flip-flop 182 clocks on the subsequent decoder count ten and, during interval IV the ROM counter 38 loads with the output of the ROM 12. The output of the ROM during interval V is a decoder write instruction. Command decoder A 48 sends a write command via bus 56 to the control input of the RAM 16 and the character stored in the buffer 28 is written in the RAM 16. In response to count ten of decoder 164, the ROM counter 38 clocks to interval VI. Interval VI is a display cycle and thus, the output of the display cycle NOR-gate 174 goes high, and the display unit 18 is refreshed by the RAM 16 output. Additionally, during interval VI, the ROM 12 generates simultaneous command and status signals neither of which are in contention for use of the RAM 16. Command decoder A 48 instructs the cursor character counter 113 to increment and status selector A 52 to check the address of the cursor character counter 113 (CCA). If the cursor counter 113 is in the last position it will not increment and an affirmative status signal will result, otherwise, the counter will increment and a negative status check will follow. In response to an affirmative cursor last character status check, a double clock pulse is sent to the ROM counter 38 and during the next interval an alarm 214 (FIG. 1B) is actuated. A negative determination causes the ROM 12 to load during interval VII and the command decoder A 48 is instructed to send a cursor character counter 113 increment signal via bus 56 to the memory address unit 20.

FIG. 9 is a timing diagram illustrating the operational sequence of the control circuit with respect to an affirmative line feed comparison status check. During interval I, the status of the I/O unit 22 is checked for the presence of incoming data and in response to an affirmative check the ROM counter 38 is double clocked. As previously mentioned, during interval II a compare command as well as a RETB command are generated. Thus, the buffer 28 is loaded with the output of the I/O unit 22 and the output of the comparator 32 is fed via the line 156 to the controller 34. During interval III the output of the display cycle NOR-gate 174 goes high. Additionally, during interval III, an affirmative comparison check places a high signal on conductor 156 which is fed through the compare AND-gate 192 causing the skip ROM flip-flop 188 to set, and thus, a double clock pulse is sent to the ROM counter 38. During interval IV, a dual command condition is created and both command decoders 48 and 50 generate commands. Command decoder A 48 resets the cursor character address counter 113 to the first character of the row and command decoder B 50 increments the cursor row address counter 110 one row.

Although the invention has been particularly shown and described with reference to a preferred embodiment thereof, it will be understood that various changes in form and detail may be made without departing from the spirit and scope of the invention.

What is claimed is:

1. An improved control circuit for a communications terminal of the type having a first selectively addressable memory providing a plurality of sequential predetermined instructional signals serving to initiate a selected operational sequence of the terminal; wherein the improvement comprises:

at least two decoders each of which can be selectively enabled, each of said decoders being responsive to at least a same one of said instructional signals;

means responsive to a preselected instructional signal from said first memory for simultaneously enabling both of said decoders in the presence of said preselected instructional signal; and said decoders including means responsive to said preselected instructional signal from said first memory for initiating simultaneous, unique terminal operations, said unique terminal operations being operationally compatible and capable of being executed simultaneously in response to said preselected instructional signal from said first memory.

2. The control circuit of claim 1 wherein at least one of said decoders is a command decoder responsive to said preselected instructional signal from said first memory and providing an operative command signal in response thereto.

3. The control circuit of claim 1 wherein at least one of said decoders is a command decoder responsive to said instructional signal and provides an operative command signal in response to said instructional signal and wherein at least one of said decoders is a status selector serving to selectively ascertain an operative condition of the terminal and providing a status signal related to said determined condition.

4. The apparatus of claim 1 which further includes a second memory serving to store a plurality of encoded characters and means for selectively displaying the characters stored in said second memory, means for controlling the periodic display of selected characters from said second memory and means for inhibiting said decoders when an instructional command therefrom initiates the utilization of said second memory simultaneously with the display of said second memory by said control means.

5. The apparatus of claim 4 wherein said inhibiting means includes means for preventing incrementation of the address of said first memory during the display of said second memory so that an instructional command initiated during said second memory display is retained by said decoders upon the completion of the display of said second memory.

6. The apparatus of claim 4 wherein said second memory, in response to a command signal from said first memory, stores a code group from said storage means, means for incrementing said first memory and loading the output of said first memory into said storage means, and means for incrementing said second memory and loading the output of said storage means into said second memory.

7. The apparatus of claim 1 which further includes means responsive to an operational comparison command from one of said decoders for comparing selected encoded data with the output of said first memory at a predetermined address thereof and for providing a comparison signal related thereto, said encoded data being compared with a second predetermined instructional signal from said first memory, said second instructional signal occurring subsequent to the address to which said decoder responded by providing said operative comparison command.

8. The apparatus of claim 2 which further includes means responsive to an operative comparison command from said command decoder for comparing selected encoded data with a second preselected instructional signal from said first memory at a predetermined address thereof and for providing a comparison signal related thereto.

9. The apparatus of claim 8 which further includes storage means, said storage means serving to store said selected encoded data in response to said operative comparison command from said command decoder and said first memory providing said second preselected signal to said comparator for comparison with the output of said storage means.

10. The apparatus of claim 9 wherein said second preselected instructional signal is provided by said first memory means in response to a memory address subsequent to the address to which said command decoder responded by providing said operative comparison command.

11. The apparatus of claim 9 which further includes a second memory which serves to store a plurality of encoded characters and display means selectively displaying the characters stored in said second memory, control means controlling the display of selected characters from said second memory and means for inhibiting said command decoders, which utilizes said second memory simultaneously with the display of said second memory by said control means.

12. The apparatus of claim 11 wherein said inhibiting means includes means for preventing incrementation of said first memory address during the display of said second memory so that the instructional command initiated by said instruction generator during the display of said second memory is retained by said instruction generator upon the completion of the display of said second memory.

13. The apparatus of claim 8 which further includes means for storing and supplying a signal to said comparison means and a multiplexer responsive to said command decoders serving to feed selected encoded data to said storing means.

14. The apparatus of claim 13 wherein the output of said first memory is fed to one input of said multiplexer, and a second memory the output of which is fed to a second input of said switching means so that either the output of said first or said second memory is selectively fed to said storage means in response to the output of said command decoder.

15. The apparatus of claim 14 wherein said selected encoded data is fed to a third input of said switching means so that in response to a selected command from one of said command decoders said selected encoded data is fed to one input of said comparing means.

16. The apparatus of claim 8 wherein said second preselected instructional signal is provided by said first memory means in response to a memory address subsequent to the memory address to which said command decoder responded by providing said operative comparison command.

17. A method of operating a communications terminal comprising the steps of:
  analyzing at least a portion of a multilevel data word from a memory to determine the presence of a selected character attribute in an extended bit level of said multilevel data word;
  generating a selected character attribute data word in response to the presence of said extended bit level; and
  sending said preselected multilevel memory word and said preselected multilevel data word from said terminal in sequence.

18. A control circuit for a communications terminal comprising an instruction generator including a preprogrammed memory having stored therein a fixed set of instructions, said preprogrammed memory having a multilevel output a counter for addressing said memory, said counter being presettable to a selected memory address, means responsive to a load signal for selectively presetting said counter with a selected multilevel output of said memory, means for selectively, singly incrementing said count to the next adjacent counter thereof and means for multiply incrementing said counter;

said instruction generator including a status selector responsive to a selected output of said memory to ascertain an operational condition of said terminal, said status selector providing a status signal related to said operational condition, said incrementing means being responsive to a first condition of said status signal for multiply incrementing said counter in response thereto, and said presetting means being responsive to a second condition of said signal for presetting said counter with an instruction at the multilevel output of said memory in response thereto.

19. A control circuit for a communications terminal comprising:
an instruction generator;
a random access memory;
a memory address unit selectively addressing said memory;
means for displaying selected information from said memory;
said memory address unit including a cursor address section for selectively addressing said memory during editing thereof and said address unit further including a display address section for addressing said memory during the display of the information from said memory, and means for causing the addressing of said memory to be determined by said display address section or by said cursor address section as determined by control signals from said instruction generator;
sequencing means for controlling the period of access of said display address unit relative to said cursor address unit with respect to said memory, said instruction generator including at least one status selector serving to ascertain a unique operative condition of the terminal in response to a single address of said memory and providing a unique status signal related to said operative condition in response to a selected instructional signal from said memory, said incrementing means being responsive to a first condition of said status signal for multiply incrementing said counter in response thereto, and means responsive to a second condition of said signal for presetting said counter with the output instruction of said memory in response thereto.

20. A control circuit for a communications terminal comprising an addressable memory, means for addressing said memory to a selected location, at least one address location of said memory having stored therewith a multilevel encoded character, at least one bit level of said memory providing enhancement attribute information for said encoded character means responsive to a selected condition of said enhancement bit level of said memory for sensing the presence of said selected character enhancement attribute information related to said character and means responsive to said character enhancement attribute sensing means for providing a corresponding related sequence of unique multilevel signals in response to the presence of said selected character enhancement attribute bit.

21. A method of operating a communications terminal comprising the steps of:
analyzing incoming multilevel coded data to determine the presence of an encoded character enhancement attribute related to a previously received incoming encoded character;
placing said preselected encoded character into a memory;
generating an attribute signal corresponding to the coded character enhancement attribute related to said preselected character; and
storing said character enhancement attribute signal as an extended bit level bit in said memory at the same address location as said preselected encoded character.

* * * * *

UNITED STATES PATENT OFFICE
CERTIFICATE OF CORRECTION

Patent No. 3,958,225   Dated May 18, 1976

Inventor(s) Kenneth W. Turner et al.

It is certified that error appears in the above-identified patent and that said Letters Patent are hereby corrected as shown below:

Column 18, line 39, "switching means" should read -- multiplexer --.

Column 18, lines 44 and 45, "switching" should read -- multiplexer --.

Column 19, line 2, after "output" insert a comma (,).

Column 20, line 40, after "extended" delete -- bit --.

Signed and Sealed this twenty-third Day of August 1977

[SEAL]

Attest:

RUTH C. MASON
Attesting Officer

C. MARSHALL DANN
Commissioner of Patents and Trademarks

Disclaimer 3,958,225.—*Kenneth W. Turner*, Des Plaines, and *George C. Zobel*, Palatine, Ill. APPARATUS AND METHOD FOR CONTROLLING A COMMUNICATIONS TERMINAL. Patent dated May 18, 1976. Disclaimer filed Apr. 18, 1977, by the assignee, *Teletype Corporation*.

Hereby enters this disclaimer to claim 6 of said patent.

[*Official Gazette September 13, 1977.*]